Nov. 30, 1965         S. J. SMITH         3,221,322
HEAVILY DAMPED EDDY CURRENT MOTOR DRIVEN SERVO MECHANISM
Filed Aug. 25, 1960                        2 Sheets-Sheet 1

INVENTOR
STANLEY J. SMITH

BY Byerly Townsend,
Watson & Churchill
ATTORNEYS.

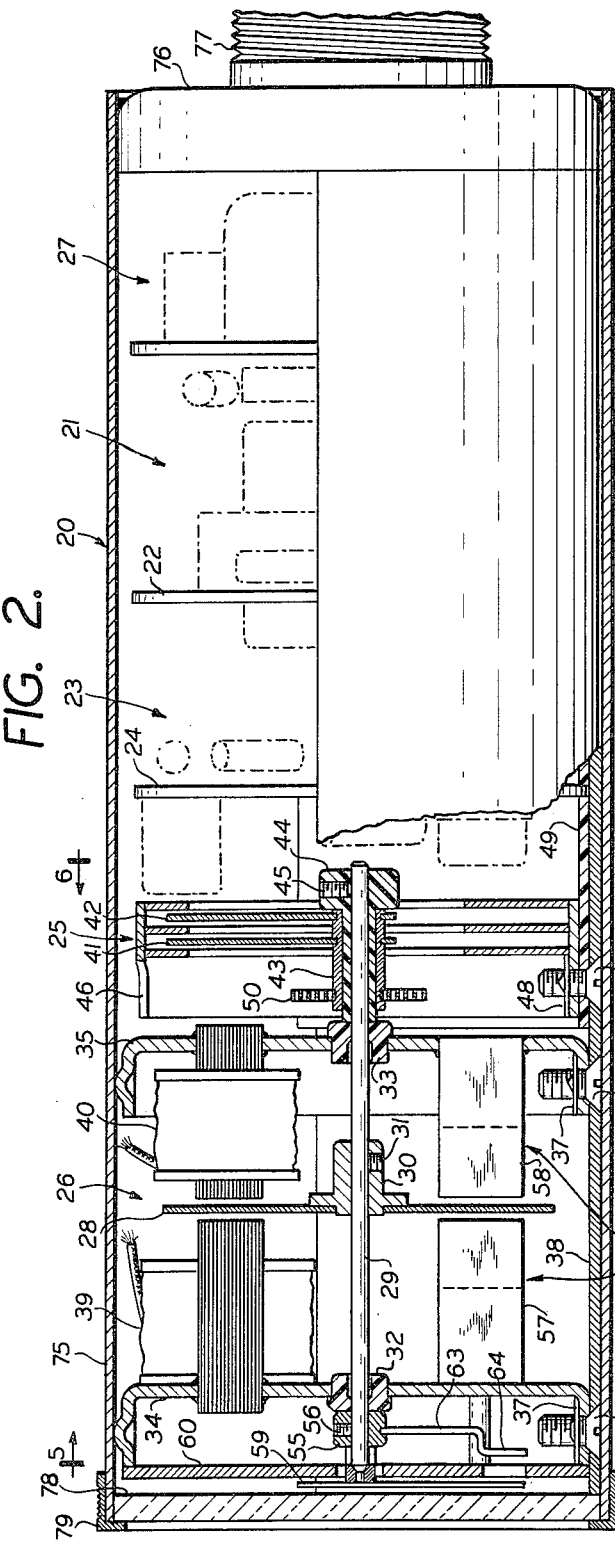

United States Patent Office 3,221,322
Patented Nov. 30, 1965

3,221,322
HEAVILY DAMPED EDDY CURRENT MOTOR DRIVEN SERVO MECHANISM
Stanley J. Smith, Chappaqua, N.Y., assignor to Simmonds Precision Products, Inc., Tarrytown, N.Y., a corporation of New York
Filed Aug. 25, 1960, Ser. No. 51,908
3 Claims. (Cl. 340—316)

The present invention relates to servo mechanisms and particularly to a motor and rebalancing element for use in a low power servo system.

Low-power servo systems find particular utility in indicating systems such as those used on aircraft for measuring and indicating fuel quantity, temperature and the like. An indicating system of this type is robust and accurate and can be applied readily to indicating at a remote point. Although such systems have many other uses, the present invention will be described with reference to aircraft fuel gaging in view of the special problems encountered therein and of the peculiar adaptability of the invention thereto.

Measuring fuel quantity on an aircraft poses several problems. It is necessary to have extreme accuracy particularly near the fuel empty condition. This dictates that the system be highly sensitive to slight change in quantity. However, while the aircraft is in flight the fuel is subject to considerable sloshing, and, where an immersed condenser is used for gaging, the error signal will change instantaneously with the sloshing. This will result in a constantly changing of fluctuating indication unless the sensitivity is decreased or the system is heavily damped in an appropriate manner.

Some of the presently known systems employ motors with wound rotors. Because of restrictions on size the number of field poles must be kept to a minimum. Since the electrical current normally used on aircraft has a frequency of 400 c.p.s. this results in high synchronous motor speeds ranging from 6,000 to 12,000 r.p.m. with 8,000 r.p.m. being often the lowest practical limit.

To counteract the sloshing problem it has become common practice to hold the response time, i.e., the time required for the indicator to move from zero to full scale, to about 5 to 10 seconds. In order to accomplish this, however, it is necessary to employ a relatively high ratio gear train between the servo motor and the system rebalancing element. For reasons of accuracy the gear train must be a precision mechanism free from backlash and characterized by a minimum of retarding friction. These requirements have been responsible for keeping up the cost of such devices.

Dynamic instability is another problem which has to be coped with. Because of the mass of the motor armature or rotor it has substantial inertia. The kinetic energy stored in the rotor must be dissipated before the system will come to rest. If the loop gain is high with a low response time, the system will hunt or oscillate around a mean reading. Normally there is considerable friction in the gear train and this serves to damp the system and prevent oscillation with an attendant undesirable loss in sensitivity.

In larger servo systems the dynamic stability problem has been overcome by rate or derivative damping. However, this usually requires a tachometer type of generator mechanically coupled to the motor and coupled into a feed-back loop. Obviously, this solution is neither practical nor feasible with small and low cost equipment.

Another problem with current designs is the resolution of the rebalance element which generally takes the form of a wire-wound potentiometer. The wire-wound is preferred over the carbon film type since the latter changes resistance appreciably with wear. However, the wire wound does not provide a smooth and continuous resistance variation due to the jumping of the wiper from turn to turn.

With the known servo indicators the indication remains at its last reading in the event of power failure or malfunction of the amplifier or the like. Thus, no warning is provided to the reader unless a separate "power off" indicator is employed, and even this will not warn of a fault within the servo loop itself which results in deenergization of the indicator.

It is, therefore, an object of the present invention to provide a low cost servo mechanism which is virtually free from all of the above-enumerated disadvantages.

Basically the invention makes use of a motor having a ratio of torque to inertia much higher than normal combined with both rate derived damping and a nearly frictionless rebalance element such that speed reducing and torque amplifying gearing is not required. When combined with a rebalance element of infinite resolution it is possible to provide a dynamically stable mechanism of extreme sensitivity which can be readily adjusted to any desired response time constant.

In accordance with the invention there is provided a servo mechanism comprising an eddy current motor having an armature assembly including a rotatably mounted shaft carrying an armature member, a servo system rebalancing element having an adjustable component carried by the assembly for rotation therewith, all of the moving parts including the armature assembly and the adjustable component being characterized by low retarding friction, low inertia, and an inherent tendency toward a relatively high operating speed, and derivative damping means operatively associated with said armature assembly for reducing the operating speed and stabilizing the mechanism to a predetermined response time constant.

For the purpose of this description the response time constant will be defined as the time it takes the servo motor to reposition the rebalance element so as to reduce the error signal to 70% of its initial magnitude when a full scale error signal is abruptly applied to the system.

The invention will be better understood after reading the following detailed description of one embodiment thereof with reference to the appended drawings in which:

FIG. 2 is a longitudinal sectional view with some parts shown only in phantom outline taken along line 2—2 in FIG. 1;

FIG. 3 is a fragmentary plan view on a reduced scale of the motor field structures of FIG. 1;

FIG. 4 is a similar fragmentary view of the damping magnets of FIG. 1;

As previously mentioned, the present invention is being described as applied to an aircraft fuel gage. As is well known, a standard arrangement for measuring aircraft fuel is to provide a self-balancing bridge circuit for measuring changes in capacitance of a probe immersed in the fuel in a tank and indicating the fuel quantity as a function of such capacitance. Such a gage is generally referred to as of the capacitance type. In general, the known circuits employ a variable resistance element for rebalancing the bridge circuit. Although it was heretofore known that a variable condenser could be used as a rebalancing element, circuits employing same have not seen much practical use.

A variable air capacitor, unlike a wire-wound potentiometer, has infinite resolution and can be made virtually frictionless. Thus, the present invention makes use of the variable capacitor as its rebalancing element.

Figure 7:
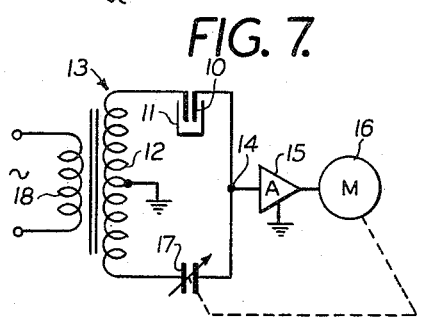
FIG. 7 is a simplified schematic circuit diagram of a liquid measuring system in which the servo mechanism of FIG. 1 can be employed.

It is believed that appropriate circuitry will be well known to those skilled in the art and, therefore, only the barest rudiments will be described with reference to FIG. 7.

A condenser such as 10 is provided for immersion in the fuel tank 11. This condenser is connected between one end of secondary winding 12 of transformer 13 and an input terminal 14 of a detector-amplifier 15 which drives a servo motor 16. The servo motor is mechanically coupled to a rebalance element which, in the present instance, is represented as an adjustable capacitor 17. The capacitor 17 is connected between the opposite end of the secondary winding 12 and the input terminal 14 of the amplifier 15. The system is energized by connecting the primary winding 18 of the transformer 13 to a source of alternating voltage. On an aircraft this will normally have a frequency of 400 c.p.s. Although not shown, the motor 16 will be provided with a reference field supply in quadrature with respect to the output of the bridge circuit. As the capacity of condenser 10 varies with change in liquid level or dielectric constant, the motor 16 will be energized to reposition the condenser 17 to rebalance the bridge until zero voltage exists between the terminal 14 and ground. An indicator (not shown) coupled to the motor will indicate fuel quantity. It is to be understood that in practice the complete circuit will have provision for adjusting the zero point of the gage as well as its range or full setting. Other adjustments may be provided in accordance with known practice.

Reference should now be had to FIGURES 1 to 6 wherein the same reference numerals are employed to designate the same or similar parts throughout. In the particular embodiment chosen for purpose of explanation, and referring particularly to FIG. 2, it will be observed that all of the components of FIG. 7 are enclosed in a single housing 20 with the exception of the capacitor immersed in the fuel tank.

The phantom outlines in the area 21 represent the components of the bridge circuit. These may be mounted on an insulated wafer or disc 22. The components of the detector-amplifier are located generally in the space 23 mounted on the insulated wafer 24. The rebalancing capacitor is designated generally by the reference character 25 while the rebalancing or servo motor is designated generally by the reference character 26. For purpose of standardization all of the devices are made to operate on 400 cycle current. However, if alternating current to operate the bridge is not available, a converter stage 27 may be provided as shown. This might be the situation in a helicopter.

Figure 5:
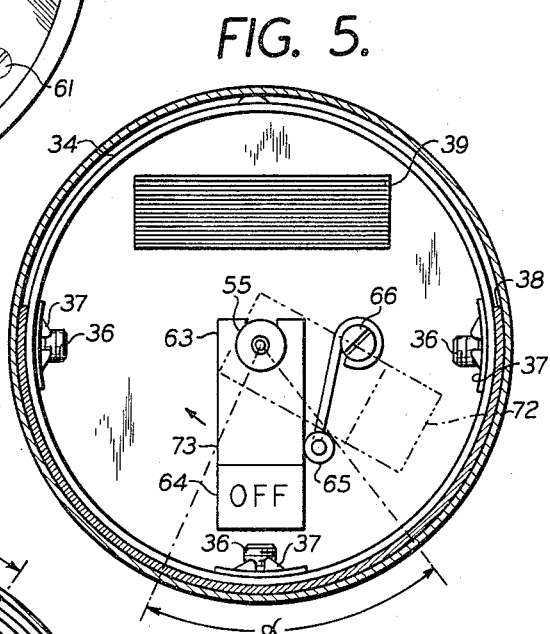
FIG. 5 is a transverse sectional view behind the dial plate taken on line 5—5 in FIG. 2.

The eddy current motor 26 consists of a conductive disc rotor 28 mounted in driving relation upon a shaft 29 by means of the bushing or hub 30 and the set screw 31. In order to keep frictional losses at a minimum the shaft 29 is journaled in bearings 32 and 33 of moulded polytetrafluoroethylene carried, respectively, in end bells 34 and 35. The end bells are secured by means of the screws 36 and speed nuts 37 in a hemi-cylindrical shell or chassis 38. The details are best seen in FIG. 5.

In known manner, reference and signal field structures 39 and 40 are mounted on the end bells so as to be operatively positioned near the outer edge of the rotor disc 28. An epoxy type cement or other means may be employed for mounting the field structures. It will be seen in FIG. 3 that the structure 39 has an E-shape core while the structure 40 has a C-shape core.

In order to keep retarding friction at a minimum the servo system rebalancing element is directly coupled in driven relation to the shaft 29. That is, the rotor, in the form of parallel vanes 41 and 42, of the capacitor 25 is mounted on a metallic sleeve 43 surmounted upon an insulating bushing 44 locked to the shaft 29 by the set screw 45. The rotor plates 41 and 42 cooperate with the stator plate assembly 46 which is secured to the shell 38 by means of the screws and speed nuts such as 47 nad 48, respectively.

In order to insulate the stator structure 46 from the shell 38 it is necessary to interpose therebetween a hemi-cylindrical insulator 49 and ensure that the screw 47 is non-conductive or plastic. Electric connection may be made to the stator plates 46 by soldering a lead thereto (not shown) in any convenient manner.

Figure 6:
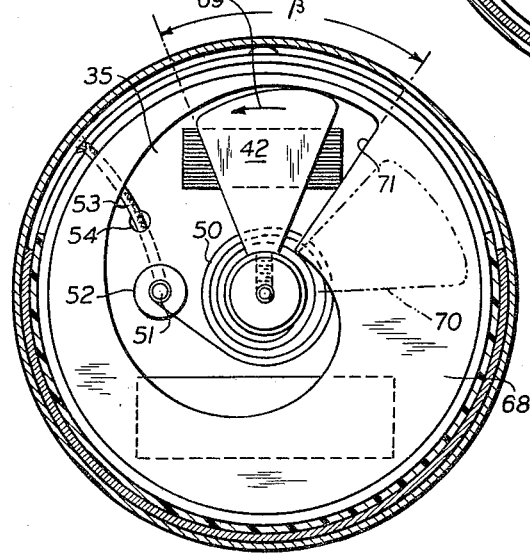
FIG. 6 is a transverse sectional view taken on line 6—6 in FIG. 2 and showing details of the rebalancing element.

A unique feature of the present invention is the arrangement employed to make electrical connection to the rotor plates 41 and 42 of the condenser 25. For this purpose there is mounted on the sleeve 43 a spiral hair spring 50 whose inner end may be soldered or otherwise connected thereto. As best seen in FIG. 6, the outer end of the hair spring 50 is joined to an electrical terminal 51 carried by an insulated bushing 52 mounted in the end bell 35. A wire connection 53 may be joined to the opposite end of the terminal 51 and brought through the aperture 54 in the end bell 35 for connection to the amplifier in known manner.

It will be noted in FIG. 2 that the bushing 44 abuts the bearing 33 to prevent axial movement to the left. In order to prevent movement of the shaft 29 to the right, there is mounted on its outer end a collar 55 fixed by a set screw 56. The collar 55 abuts the bearing 32.

A pair of C-shape permanent magnets 57 and 58 are mounted, respectively, in end bells 34 and 35 so as to provide derivative damping for the disc 28 of the motor. The strength of these magnets as well as their relative spacing is chosen to provide a relatively high degree of damping as will be more fully explained hereinafter.

Figure 1:
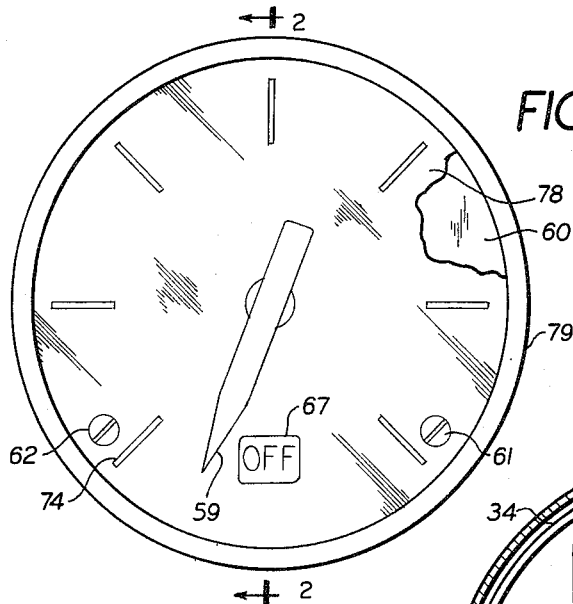
FIG. 1 is a front elevational view of the dial face of an indicator assembly incorporating a servo mechanism in accordance with the invention.

In order to provide an indication, a pointer 59 is press fitted upon the end of the shaft 29, as shown. A dial plate 60 is positioned immediately behind or below the pointer 59 secured to the end bell 34 by the screws 61 and 62. The latter, are best seen in FIG. 1.

Referring now to FIG. 6, it will be seen that the vanes 41 and 42 are wedge shaped and provided with a slight taper along their peripheral edge. It should be readily apparent that the center of gravity of the moving parts consisting of the shaft 29, the pointer 59 and the rotor plates 41 and 42 will be displaced laterally from the axis of the shaft. Unless some means is provided to balance the shaft, an error will be introduced due to the off-set center of gravity. Therefore, in order to balance the moving structure there is provided a counterweight in the form of a radial arm 63 secured to the collar 55 in any convenient manner.

It will be observed from FIGURES 2 and 5 that the extremity of the arm 63 is off-set at 64 and provided with the legend "OFF" on its surface facing the dial plate 60. At this point, we can consider the further function of the hair spring 50. This spring is deliberately made very light so that it will not adversely interfere with the operation of the servo motor and rebalance element during normal operation of the gage circuit. However, if power to the motor should be interrupted so as to remove any driving torque, the force developed by the spring 50 will be adequate to rotate the shaft 29 and the pointer 59 towards the zero position on the dial. Rotation will continue until the arm 63 engages a finger 65 held in its path by means of the mounting screw 66 (best seen in FIG. 5). In this position of the arm 63 the "OFF" legend will appear opposite the window 67 in the dial plate 60 in order to inform the observer that power to the indicator has been interrupted.

Referring to FIG. 6, it will be seen that the stator plates 68 in the stator assembly 46 are provided in the form of tapered annuli following a modified geometric law. If an ideal capacitor were had, the stator plates would take the form of an archimedian spiral in order to produce a linear capacity variation with rotation. However, due to the distorting effect of "fringe" capacitance, particularly near the zero end of the dial, that is, with the capacitor rotor in the general position shown in FIG. 6, it will be found expedient to derive the required shape empirically. A method that has been found satisfactory is to construct a scale model much larger than that ultimately required, e.g., on a scale of 10:1, which may readily be modified mechanically by variation in area such as by application of a conductive paint upon a normally insulating surface or the like. Once a suitable shape has been established it may be used as a templet to cut a die by reduction on a pantograph in order to produce uniform plates in quantity. Photoengraving methods may also be used to achieve similar results.

It will be well understood by those skilled in the art that in order to avoid ambiguity in operation of the system, the capacitance of the capacitor 46 must always change in the same direction for a given direction of shaft rotation. Thus, if shaft rotation is as shown by the arrow 69 in FIG. 6, some means must be provided to limit rotation of the shaft when the rotor reaches the position shown by the dot-dash lines 70. That is, the rotor must not be permitted to move beyond the edge 71 of the stator plates. This limiting action can be achieved by proper choice of the width of the arm 63 as best seen in FIG. 5. Thus, when the arm 63 reaches the position shown by dot-dash outline 72 it will engage the opposite side of the finger 65. By selecting the angle $\alpha$ represented on FIG. 5 so that it is equal or larger than the angle $\beta$ shown on FIG. 6, the proper limiting action will be obtained. In FIG. 5, the angle $\alpha$ is defined by lines drawn from the center of the shaft 29 through the point 73 on the arm 63 in both of its extreme limiting positions. The point 73 represents the point of engagement with the finger 65 in the position 72.

As shown in FIG. 1, the pointer 59 is arranged to move to a below zero position when the indicator is deenergized and the "OFF" signal appears in window 67. The zero position may be represented by the index mark 74.

After all of the components of the system are mounted in the half cylinder 38, the assembly is slipped within a tubular housing 75. One end of the housing 75 is sealed by the end closure 76 carrying the electrical plug housing 77. The opposite end of the tube 75 is sealed by a transparent window 78 secured in place by a bezel 79. If desired, the tube 75 may be evacuated and filled with an inert gas.

It should now be apparent that if the counterweight 63 is so chosen so as to place all of the moving parts in dynamic balance, the only force to be overcome by the motor 26 will be that due to friction and the slight restoring force of the spring 50. Friction is contributed solely by the bearings 32 and 33, and, by making them of polytetrafluoroethylene, this is kept at a minimum. By their very nature the rotating parts have very low inertia. Thus, in the absence of the damping magnets 57 and 58, the motor 26 would tend to operate at an extremely high speed whenever energized. An extremely strong damping field must, therefore, be provided so as to reduce the speed to some practical value. A figure that has been found satisfactory is approximately 30 r.p.m. This speed is not high enough to provide sufficient kinetic energy to cause more than one minor overshoot. If zero to full scale travel represents 270° then it will take 1.5 seconds for the pointer to sweep the entire dial.

Because the magnets 57 and 58 develop zero retarding force when the velocity of the rotor 28 is zero, the motor is highly sensitive to small error signals. In fact, it is readily possible to render the system oversensitive and unstable if the damping force is not adequate.

If the torque developed by the hair spring 50 is found to be objectionable during normal operation of the device, a steady signal bias may be applied to the motor to counteract. Since the signal bias will also disappear if there should be a power failure, this will not interfere with the operation of the power "OFF" signal provided by the flag 64 on the arm 63.

From the foregoing description, it should be evident that several of the components in the device serve more than one function. Thus, the arm 63, in addition to its function as a limiting means, also functions as a signalling means for indicating when the motor is deenergized. In addition to these functions, the arm 63 also operates as a counterweight to balance the off-set position of the capacitor rotor. The hair spring 50 functions both to provide an electrical connection to the capacitor rotor and to provide a restoring force to the motor shaft when the motor is de-energized.

It should be understood that the shaping of the stator plates of the rebalancing capacitor may be varied in order to provide any desired characteristic to the circuit operation. Although the invention has been described with reference to a capacitance gage, it should be understood that it is readily applicable to other measuring problems so long as a relatively friction-free rebalancing element can be used in directly coupled relationship to the motor armature.

Having described in detail the invention with reference to a presently preferred embodiment thereof, it is to be understood that the details thereof may be varied or modified as will appear to those skilled in the art without departing from the true spirit of the invention as defined in the appended claims.

What is claimed is:

1. In a servo mechanism, an eddy current motor having an armature mounted in driving relation upon a shaft, a servo system rebalancing capacitor having at least one vane-like electrode mounted on said shaft and extending radially therefrom on one side thereof, a radially directed arm secured to said shaft and projecting from the side of said shaft opposite to said one side for dynamically balancing the moving parts, all of the moving parts being characterized by low retarding friction, low inertia, and an inherent tendency toward a relatively high operating speed, and derivative damping means acting upon said armature for reducing the operating speed and stabilizing the mechanism to a predetermined response time constant.

2. In a servo mechanism, an eddy current motor having a conductive armature mounted in driving relation upon a shaft, a first capacitor electrode structure supported adjacent said shaft, a second capacitor electrode mounted in driven relation upon said shaft in cooperative relation to said first electrode structure, spiral spring means coupled to said shaft for tending to cause rotation thereof in one direction toward a home position, means insulating said spring and said second electrode from said shaft, one end of said spring being conductively connected to said second electrode and the other end of said spring being coupled to means for establishing an electrical connection thereto, all of the moving parts including said armature, said shaft, and said second electrode being characterized by low retarding friction, low inertia, and an inherent tendency toward a relatively high operating speed, and magnetic field means directing flux through said armature for reducing the operating speed and stabilizing the mechanism to a predetermined response time constant.

3. In a servo mechanism, an eddy current motor having an armature assembly including a rotatably mounted shaft carrying an armature member, a servo system rebalancing element having an adjustable component carried by said assembly for rotation therewith, a pointer secured to one end of said shaft, all of the moving parts, including said armature assembly and said adjustable component, being characterized by low retarding friction, low inertia, and an inherent tendency toward a relatively high operating speed, derivative damping means acting upon said armature assembly for reducing the operating speed and stabilizing the mechanism to a predetermined response time constant, a dial plate positioned immediately below said pointer with said shaft passing through a central aperture therein, a radially directed arm secured to said shaft for rotation therewith and carrying a signal element immediately below said dial plate, fixed stop means positioned in the path of rotation of said arm to limit rotation of said shaft, and spring means coupled between said shaft and a fixed point for tending to rotate said shaft in one direction until said arm engages said stop means, said spring means having insufficient tension to prevent rotation of said shaft in the opposite direction when said motor is suitably energized, said dial plate having a small opening therethrough through which said signal element is visible when said arm engages said stop means.

References Cited by the Examiner

UNITED STATES PATENTS

| | | | |
|---|---|---|---|
| 2,476,496 | 7/1949 | Kliever | 318—29 |
| 2,644,243 | 7/1953 | Breeze | 340—200 |
| 2,848,669 | 8/1958 | Smith | 340—187 |
| 2,866,180 | 12/1958 | Rudolf | 340—187 |
| 2,962,641 | 11/1960 | Maltby | 318—29 |
| 3,080,513 | 3/1963 | Edwards | 340—187 |

FOREIGN PATENTS 945,223   1/1956   Germany.

OTHER REFERENCES

Publication I: Standard Handbook for Electrical Engineers, sec. 3–199, pp. 168–169 (copyright 1941).

NEIL C. READ, *Primary Examiner.*

IRVING L. SRAGOW, THOMAS B. HABECKER, *Examiners.*